US010805901B1

(12) United States Patent
Mappus et al.

(10) Patent No.: US 10,805,901 B1
(45) Date of Patent: Oct. 13, 2020

(54) USER EQUIPMENT LOCALIZATION THROUGH TIME SERIES SEARCH

(71) Applicant: AT&T Intellectual Property I, L.P., Atlanta, GA (US)

(72) Inventors: Rudolph Mappus, Plano, TX (US); Vijayan Nagarajan, Plano, TX (US); Abhishek Mishra, Dallas, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/799,253

(22) Filed: Feb. 24, 2020

Related U.S. Application Data

(63) Continuation of application No. 16/418,034, filed on May 21, 2019, now Pat. No. 10,575,276.

(51) Int. Cl.
*H04W 64/00* (2009.01)
*G01S 5/02* (2010.01)

(52) U.S. Cl.
CPC ......... *H04W 64/003* (2013.01); *G01S 5/0236* (2013.01); *H04W 64/006* (2013.01)

(58) Field of Classification Search
None
See application file for complete search history.

(56) References Cited

U.S. PATENT DOCUMENTS

| 2005/0179591 | A1* | 8/2005 | Bertoni | G01S 5/02 342/453 |
| 2011/0025496 | A1* | 2/2011 | Cova | G01S 5/0027 340/539.13 |
| 2012/0214515 | A1* | 8/2012 | Davis | G01S 5/22 455/456.3 |
| 2013/0260789 | A1* | 10/2013 | Woo | H04W 4/027 455/456.1 |
| 2014/0003195 | A1* | 1/2014 | Vonog | H04B 7/26 367/129 |

(Continued)

OTHER PUBLICATIONS

Gomes J.B., Phua C., Krishnaswamy S. (2013) Where Will You Go? Mobile Data Mining for Next Place Prediction. In: Bellatreche L., Mohania M.K. (eds) Data Warehousing and Knowledge Discovery. DaWaK 2013. Lecture Notes in Computer Science, vol. 8057. Springer, Berlin, Heidelberg. https://www.idiap.ch/project/mdc/publications/files/nov13_08_nextPlace-dawak2013.pdf.

(Continued)

*Primary Examiner* — Ernest G Tacsik

(57) ABSTRACT

A processing system collects data points, wherein each data point indicates a location of user equipment in a telecommunication service provider network at a point in time, generates, for a first data point, a set of features over a plurality of time windows, wherein the set includes time series features, estimates an importance of each feature, wherein the importance indicates an accuracy with which the feature allows for estimation of an unseen location of the user equipment, wherein the unseen location is a location that is not identified in the plurality of data points, selects a threshold number of features from the set, wherein the threshold number of features have a greatest importance relative to all features in the set, generates a plurality of predictions of the unseen location, using the threshold number of features, aggregates the plurality of predictions, and estimates the unseen location based on the aggregating.

20 Claims, 4 Drawing Sheets

(56) References Cited

U.S. PATENT DOCUMENTS

| | | | | |
|---|---|---|---|---|
| 2017/0064515 A1* | 3/2017 | Heikkila | ............... | H04W 4/026 |
| 2018/0302838 A1* | 10/2018 | Loussides | ............ | H04B 17/309 |
| 2019/0265348 A1* | 8/2019 | Bengtsson | ............. | G01S 13/86 |
| 2019/0302222 A1* | 10/2019 | Bradley | .................... | G01S 5/18 |

OTHER PUBLICATIONS

ScienceNode; Greg Moore (Oct. 28, 2015) "Sifting big mobile phone date predicts your next move". https://sciencenode.org/feature/sifting-big-mobile-phone-data-predicts-your-next-move.php.

Linyuan Xia, Qiumei Huang, and Dongjin Wu. (Apr. 1, 2018) "Decision Tree-Based Contextual Location Prediction from Mobile Device Logs" Mobile Information Systems, vol. 2018, Article ID 1852861, 11 pages. https://www.hindawi.com/journals/misy/2018/1852861/.

Du Y, Wang C, Qiao Y, Zhao D, Guo W (2018) A geographical location prediction method based on continuous time series Markov model. PLoS One 13(11): e0207063. https://journals.plos.org/plosone/article?id=10.1371/journal.pone.0207063.

\* cited by examiner

USER EQUIPMENT LOCALIZATION THROUGH TIME SERIES SEARCH

This application is a continuation of U.S. patent application Ser. No. 16/418,034, filed May 21, 2019, now U.S. Pat. No. 10,575,276, which is herein incorporated by reference in its entirety.

The present disclosure relates generally to wireless communication networks, and relates more particularly to devices, non-transitory computer-readable media, and methods for localizing user equipment in a mobility network using a time series search.

BACKGROUND

In mobility networks, the ability to localize user equipment with high precision has a number of network-centric benefits. These benefits include the ability to optimize the network configuration for common locations or clusters of locations within a propagation area.

SUMMARY

In one example, the present disclosure discloses devices, non-transitory computer-readable media, and methods for localizing user equipment in a mobility network using a time series search. For instance, in one example, a method includes collecting, by a processing system of a telecommunication service provider network, a first plurality of data points, wherein each data point of the first plurality of data points indicates a location of an item of user equipment in the telecommunication service provider network at a point in time previous a current time, generating, by the processing system, for a first data point of the first plurality of data points, a first set of features over a plurality of time windows within a time period covered by the first plurality of data points, wherein the first set of features includes time series features, estimating, by the processing system, an importance of each feature in the first set of features, wherein the importance indicates an accuracy with which the each feature allows for estimation of an unseen location of the item of user equipment, wherein the unseen location is a location that is not identified in the plurality of data points, selecting, by the processing system, a threshold number of features from the first set of features, wherein the threshold number of features have a greatest importance relative to all features in the first set of features, generating, by the processing system, a first plurality of predictions of the unseen location, using the threshold number of features, aggregating, by the processing system, the first plurality of predictions, and estimating, by the processing system, the unseen location based on the aggregating.

In another example, a non-transitory computer-readable medium stores instructions which, when executed by a processing system of a telecommunication service provider network, cause the processing system to perform operations. The operations include collecting a first plurality of data points, wherein each data point of the first plurality of data points indicates a location of an item of user equipment in the telecommunication service provider network at a point in time previous a current time, generating for a first data point of the first plurality of data points, a first set of features over a plurality of time windows within a time period covered by the first plurality of data points, wherein the first set of features includes time series features, estimating an importance of each feature in the first set of features, wherein the importance indicates an accuracy with which the each feature allows for estimation of an unseen location of the item of user equipment, wherein the unseen location is a location that is not identified in the plurality of data points, selecting a threshold number of features from the first set of features, wherein the threshold number of features have a greatest importance relative to all features in the first set of features, generating a first plurality of predictions of the unseen location, using the threshold number of features, aggregating the first plurality of predictions, and estimating the unseen location based on the aggregating.

In another example, a device includes a processing system including at least one processor and a non-transitory computer-readable medium storing instructions which, when executed by the processing system when deployed in a telecommunication service provider network, cause the processing system to perform operations. The operations include collecting a first plurality of data points, wherein each data point of the first plurality of data points indicates a location of an item of user equipment in the telecommunication service provider network at a point in time previous a current time, generating for a first data point of the first plurality of data points, a first set of features over a plurality of time windows within a time period covered by the first plurality of data points, wherein the first set of features includes time series features, estimating an importance of each feature in the first set of features, wherein the importance indicates an accuracy with which the each feature allows for estimation of an unseen location of the item of user equipment, wherein the unseen location is a location that is not identified in the plurality of data points, selecting a threshold number of features from the first set of features, wherein the threshold number of features have a greatest importance relative to all features in the first set of features, generating a first plurality of predictions of the unseen location, using the threshold number of features, aggregating the first plurality of predictions, and estimating the unseen location based on the aggregating.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

The present disclosure broadly discloses methods, computer-readable media, and devices for localizing user equipment in a mobility network using a time series search. As discussed above, the ability to localize user equipment with high precision has a number of network-centric benefits.

However, since the user equipment tends not to report its location with a high enough frequency to support canonical localization methods (e.g., only a few location samples per user equipment may be available), the ability to actually capitalize on location information may be limited. Moreover, the location information that is available may not be very precise.

Examples of the present disclosure localize user equipment in a mobility network with high precision by using a time series search. For instance, a piece of user equipment may report several location readings over time, and examples of the present disclosure may generate a set of location features for the user equipment from such a set of historical location readings, as well as from additional user equipment data such as velocity, acceleration, and the like. Subsequently, a large space of time series-based features may be searched using the location features and/or more current observed sequences to produce a current location estimate for the user equipment, to predict a future location of the user equipment, or to estimate a previous location of the user equipment that was not reported. These and other aspects of the present disclosure are discussed in greater detail below in connection with the examples of FIGS. 1-3.

Figure 1:
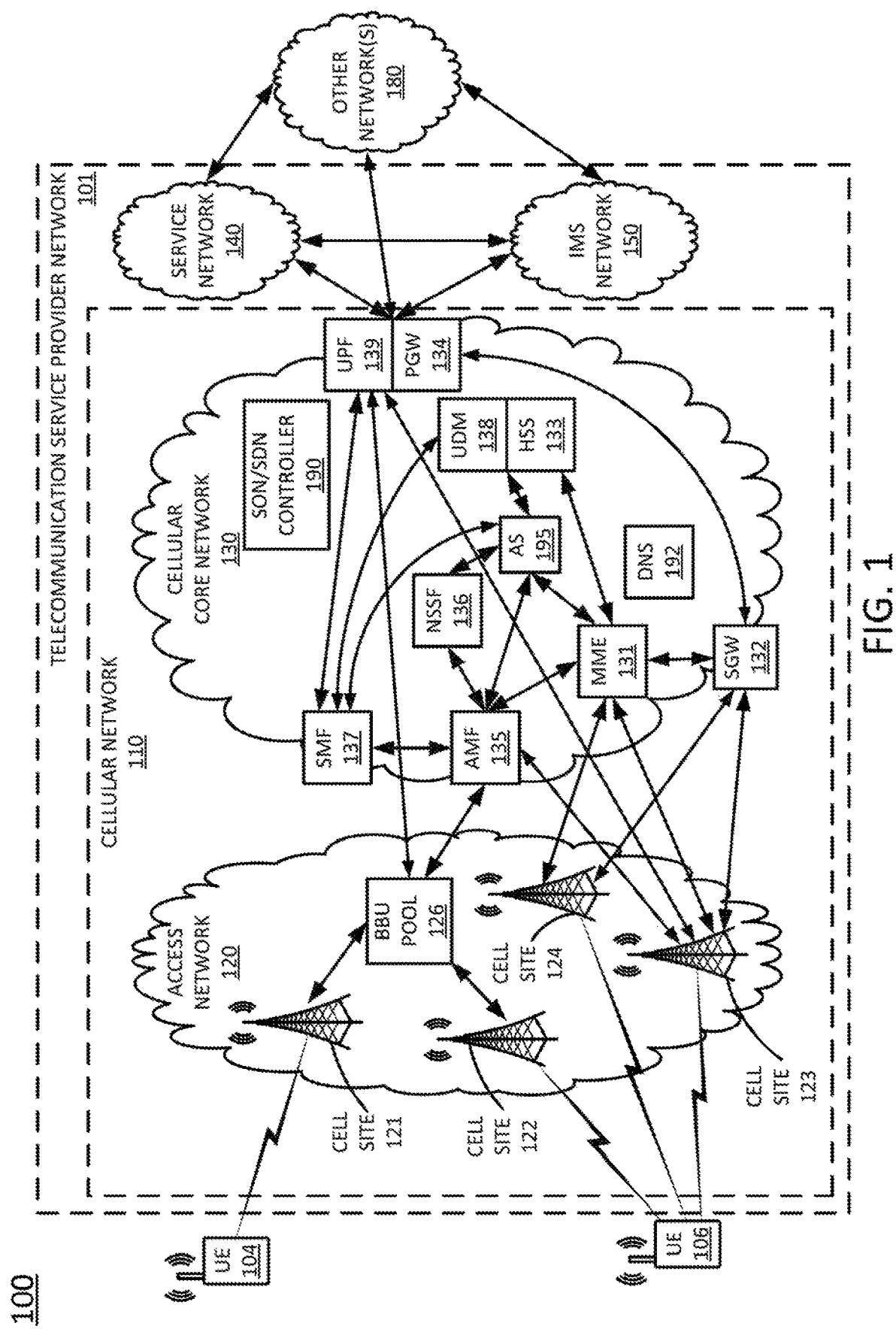
FIG. 1 illustrates an example network or system in which examples of the present disclosure for localizing user equipment in a mobility network using a time series search may operate.

To better understand the present disclosure, FIG. 1 illustrates an example network or system 100 in which examples of the present disclosure for localizing user equipment in a mobility network using a time series search may operate. In one example, the system 100 includes a telecommunication service provider network 101. The telecommunication service provider network 101 may comprise a cellular network 110 (e.g., a 4G/Long Term Evolution (LTE) network, a 4G/5G hybrid network, or the like), a service network 140, and an IP Multimedia Subsystem (IMS) network 150. The system 100 may further include other networks 180 connected to the telecommunication service provider network 101.

In one example, the cellular network 110 comprises an access network 120 and a cellular core network 130. In one example, the access network 120 comprises a cloud RAN. For instance, a cloud RAN is part of the 3GPP 5G specifications for mobile networks. As part of the migration of cellular networks towards 5G, a cloud RAN may be coupled to an Evolved Packet Core (EPC) network until new cellular core networks are deployed in accordance with 5G specifications. In one example, access network 120 may include cell sites 121 and 122 and a baseband unit (BBU) pool 126. In a cloud RAN, radio frequency (RF) components, referred to as remote radio heads (RRHs), may be deployed remotely from baseband units, e.g., atop cell site masts, buildings, and so forth. In one example, the BBU pool 126 may be located at distances as far as 20-80 kilometers or more away from the antennas/remote radio heads of cell sites 121 and 122 that are serviced by the BBU pool 126.

Although cloud RAN infrastructure may include distributed RRHs and centralized baseband units, a heterogeneous network may include cell sites where RRH and BBU components remain co-located at the cell site. For instance, cell site 123 may include RRH and BBU components. Thus, cell site 123 may comprise a self-contained "base station." With regard to cell sites 121 and 122, the "base stations" may comprise RRHs at cell sites 121 and 122 coupled with respective baseband units of BBU pool 126.

It should also be noted in accordance with efforts to migrate to 5G networks, cell sites may be deployed with new antenna and radio infrastructures such as multiple input multiple output (MIMO) antennas, and millimeter wave antennas. In this regard, a cell, e.g., the footprint or coverage area of a cell site may in some instances be smaller than the coverage provided by NodeBs or eNodeBs of 3G-4G RAN infrastructure. For example, the coverage of a cell site utilizing one or more millimeter wave antennas may be 1000 feet or less.

In accordance with the present disclosure, each of cell sites 121-123 may comprise a 5G "new radio" (NR), also referred to as a gNodeB (gNB). For instance, cell sites 121-123 may comprise directional antennas, or antenna arrays (e.g., having a half-power azimuthal beamwidth of 120 degrees or less, 90 degrees or less, 60 degrees or less, etc.), e.g., multiple input multiple output (MIMO) antenna (s). For instance, 5G antenna arrays may be arranged for beamforming in a frequency band designated for 5G high data rate communications. For instance, the antenna array for 5G may be designed for operation in a frequency band greater than 5 GHz. In one example, the array for 5G may be designed for operation in a frequency band greater than 20 GHz. Cell site 123 may also include a corresponding 5G radio (also referred to as a transceiver, or base station equipment) to receive (and transmit) via directional beam(s), or multi-path and/or spatial diversity signals. For cell sites 121 and 122, BBU pool 126 may include corresponding 5G radios.

In one example, access network 120 may include both 4G/LTE and 5G radio access network infrastructure. For example, access network 120 may include cell site 124, which may comprise 4G/LTE base station equipment, e.g., an eNodeB. In addition, access network 120 may include cell sites comprising both 4G and 5G base station equipment, e.g., respective antennas, feed networks, baseband equipment, and so forth. For instance, cell site 123 may include both 4G and 5G radios/base station equipment and corresponding connections to 4G and 5G components in cellular core network 130. Furthermore, in accordance with the present disclosure, a base station (e.g., cell sites 121-124 and/or baseband units within BBU pool 126) may comprise all or a portion of a computing device or system, such as computing system 400, and/or processing system 402 as described in connection with FIG. 4 below, and may be configured to provide one or more functions to support examples of the present disclosure for FIG. 1 illustrates an example network, or system 100 in which examples of the present disclosure for localizing user equipment in a mobility network using a time series search may operate. Although access network 120 is illustrated as including both 4G and 5G components, in another example, 4G and 5G components may be considered to be contained within different access networks. Nevertheless, such different access networks may have a same wireless coverage area, or fully or partially overlapping coverage areas.

In one example, the cellular core network 130 provides various functions that support wireless services in the LTE environment. In one example, cellular core network 130 is an Internet Protocol (IP) packet core network that supports both real-time and non-real-time service delivery across a LTE network, e.g., as specified by the 3GPP standards. In one example, cell sites 121 and 122 in the access network 120 are in communication with the cellular core network 130 via baseband units in BBU pool 126.

In cellular core network 130, network devices such as Mobility Management Entity (MME) 131 and Serving Gateway (SGW) 132 support various functions as part of the cellular network 110. For example, MME 131 is the control node for LTE access network components, e.g., cell site 124 and/or eNodeB aspects of cell site 123. In one embodiment, MME 131 is responsible for UE (User Equipment) tracking and paging (e.g., such as retransmissions), bearer activation and deactivation process, selection of the SGW, and authentication of a user. In one embodiment, SGW 132 routes and forwards user data packets, while also acting as the mobility anchor for the user plane during inter-cell handovers and as an anchor for mobility between 5G, LTE and other wireless technologies, such as 2G and 3G wireless networks.

In addition, cellular core network 130 may comprise a Home Subscriber Server (HSS) 133 that contains subscription-related information (e.g., subscriber profiles), performs authentication and authorization of a wireless service user, and provides information about the subscriber's location. The cellular core network 130 may also comprise a packet data network (PDN) gateway (PGW) 134 which serves as a gateway that provides access between the cellular core network 130 and various packet data networks (PDNs), e.g., service network 140, IMS network 150, other network(s) 180, and the like.

The foregoing describes long term evolution (LTE) cellular core network components (e.g., EPC components). In accordance with the present disclosure, cellular core network 130 may further include other types of wireless network components e.g., 2G network components, 3G network components, 5G network components, etc. Thus, cellular core network 130 may comprise an integrated network, e.g., including any two or more of 2G-5G infrastructure and technologies, and the like. For example, as illustrated in FIG. 1, cellular core network 130 further comprises 5G components, including: an access and mobility management function (AMF) 135, a network slice selection function (NSSF) 136, a session management function (SMF), a unified data management function (UDM) 138, and a user plane function (UPF) 139.

In one example, AMF 135 may perform registration management, connection management, endpoint device reachability management, mobility management, access authentication and authorization, security anchoring, security context management, coordination with non-5G components, e.g., MME 131, and so forth. NSSF 136 may select a network slice or network slices to serve an endpoint device, or may indicate one or more network slices that are permitted to be selected to serve an endpoint device. For instance, in one example, AMF 135 may query NSSF 136 for one or more network slices in response to a request from an endpoint device to establish a connection to communicate with a PDN. The NSSF 136 may provide the selection to AMF 135, or may provide one or more permitted network slices to AMF 135, where AMF 135 may select the network slice from among the choices. A network slice may comprise a set of cellular network components, such as AMF(s), SMF(s), UPF(s), and so forth that may be arranged into different network slices which may logically be considered to be separate cellular networks. In one example, different network slices may be preferentially utilized for different types of services. For instance, a first network slice may be utilized for sensor data communications, Internet of Things (IoT), and machine-type communication (MTC), a second network slice may be used for streaming video services, a third network slice may be utilized for voice calling, a fourth network slice may be used for gaming services, and so forth.

In one example, SMF 137 may perform endpoint device IP address management, UPF selection, UPF configuration for endpoint device traffic routing to an external packet data network (PDN), charging data collection, quality of service (QoS) enforcement, and so forth. UDM 138 may perform user identification, credential processing, access authorization, registration management, mobility management, subscription management, and so forth. As illustrated in FIG. 1, UDM 138 may be tightly coupled to HSS 133. For instance, UDM 138 and HSS 133 may be co-located on a single host device, or may share a same processing system comprising one or more host devices. In one example, UDM 138 and HSS 133 may comprise interfaces for accessing the same or substantially similar information stored in a database on a same shared device or one or more different devices, such as subscription information, endpoint device capability information, endpoint device location information, and so forth. For instance, in one example, UDM 138 and HSS 133 may both access subscription information or the like stored in a unified data repository (UDR) (not shown).

UPF 139 may provide an interconnection point to one or more external packet data networks (PDN(s)) and perform packet routing and forwarding, QoS enforcement, traffic shaping, packet inspection, and so forth. In one example, UPF 139 may also comprise a mobility anchor point. In this regard, it should be noted that UPF 139 and PGW 134 may provide the same or substantially similar functions, and in one example, may comprise the same device, or may share a same processing system comprising one or more host devices.

It should be noted that other examples may comprise a cellular network with a "non-stand alone" (NSA) mode architecture where 5G radio access network components, such as a "new radio" (NR), "gNodeB" (or "gNB"), and so forth are supported by a 4G/LTE core network (e.g., an EPC network), or a 5G "standalone" (SA) mode point-to-point or service-based architecture where components and functions of an EPC network are replaced by a 5G core network (e.g., an "NC"). For instance, in non-standalone (NSA) mode architecture, LTE radio equipment may continue to be used for cell signaling and management communications, while user data may rely upon a 5G new radio (NR), including millimeter wave communications, for example. However, the example of FIG. 1 provides a hybrid, or integrated 4G/LTE-5G cellular core network 130. In this regard, FIG. 1 illustrates a connection between AMF 135 and MME 131, e.g., an "N26" interface which may convey signaling between AMF 135 and MME 131 relating to establishing a dual session packet data network connection, and so forth.

In one example, service network 140 may comprise one or more devices for providing services to subscribers, customers, and or users. For example, telecommunication service provider network 101 may provide a cloud storage service, web server hosting, and other services. As such, service network 140 may represent aspects of telecommunication service provider network 101 where infrastructure for supporting such services may be deployed. In one example, other networks 180 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 180 may include different types of networks. In another example, the other networks 180 may be the same type of network. In one example, the other networks 180 may represent the Internet in general. In this regard, it should be noted that any one or more of service network 140, other networks 180, or IMS network 150 may comprise a packet data network (PDN) to which an endpoint device may establish a connection via cellular core network 130 in accordance with the present disclosure.

In one example, any one or more of the components of cellular core network 130 may comprise network function virtualization infrastructure (NFVI), e.g., SDN host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, MME 131 may comprise a vMME, SGW 132 may comprise a vSGW, and so forth. Similarly, AMF 135, NSSF 136, SMF 137, UDM 138, and/or UPF 139 may also comprise NFVI configured to operate as VNFs. In addition, when comprised of various NFVI, the cellular core network 130 may be expanded (or contracted) to include more or less components than the state of cellular core network 130 that is illustrated in FIG. 1.

In this regard, the cellular core network 130 may also include a self-optimizing network (SON)/software defined network (SDN) controller 190. In one example, SON/SDN controller 190 may function as a self-optimizing network (SON) orchestrator that is responsible for activating and deactivating, allocating and deallocating, and otherwise managing a variety of network components. For instance, SON/SDN controller 190 may activate and deactivate antennas/remote radio heads of cell sites 121 and 122, respectively, may allocate and deactivate baseband units in BBU pool 126, and may perform other operations for activating antennas based upon a location and a movement of an endpoint device or a group of endpoint devices, in accordance with the present disclosure.

In one example, SON/SDN controller 190 may further comprise a SDN controller that is responsible for instantiating, configuring, managing, and releasing VNFs. For example, in a SDN architecture, a SDN controller may instantiate VNFs on shared hardware, e.g., NFVI/host devices/SDN nodes, which may be physically located in various places. In one example, the configuring, releasing, and reconfiguring of SDN nodes is controlled by the SON/SDN controller 190, which may store configuration codes, e.g., computer/processor-executable programs, instructions, or the like for various functions which can be loaded onto an SDN node. In another example, the SON/SDN controller 190 may instruct, or request an SDN node to retrieve appropriate configuration codes from a network-based repository, e.g., a storage device, to relieve the SDN controller from having to store and transfer configuration codes for various functions to the SDN nodes.

Accordingly, the SON/SDN controller 190 may be connected directly or indirectly to any one or more network elements of cellular core network 130, and of the system 100 in general. Due to the relatively large number of connections available between SON/SDN controller 190 and other network elements, none of the actual links to the SON/SDN controller 190 are shown in FIG. 1. Similarly, intermediate devices and links between MME 131, SGW 132, cell sites 121-124, PGW 134, AMF 135, NSSF 136, SMF 137, UDM 138, and/or UPF 139, and other components of system 100 are also omitted for clarity, such as additional routers, switches, gateways, and the like.

FIG. 1 also illustrates various endpoint devices, e.g., user equipment (UE) 104 and 106. UE 104 and 106 may each comprise a cellular telephone, a smartphone, a tablet computing device, a laptop computer, a pair of computing glasses, a wireless enabled wristwatch, a wireless transceiver for a fixed wireless broadband (FWB) deployment, or any other cellular-capable mobile telephony and computing device (broadly, "an endpoint device"). In one example, each of UE 104 and UE 106 may each be equipped with one or more directional antennas, or antenna arrays (e.g., having a half-power azimuthal beamwidth of 120 degrees or less, 90 degrees or less, 60 degrees or less, etc.), e.g., MIMO antenna(s), and a corresponding transceiver to receive directional beam(s), or multi-path and/or spatial diversity signals. For instance, 5G antenna arrays may be arranged for beamforming in a frequency band designated for 5G high data rate communications. For instance, the antenna array for 5G may be designed for operation in a frequency band greater than 5 GHz. In one example, the array for 5G may be designed for operation in a frequency band greater than 20 GHz.

In one example, aspects of the present disclosure for localizing user equipment in a mobility network using a time series search, e.g., as described in greater detail below in connection with the example method 300 of FIG. 3, may be performed by MME 131 and/or SGW 132. However, in another example, aspects of the present disclosure for localizing user equipment in a mobility network using a time series search may alternatively or additionally be provided via another device, such as application server (AS) 195. In one example, AS 195 may comprise an application function (AF) in accordance with 5G cellular core network component designations. However, in accordance with the present disclosure, AS 195 may also be in communication with 4G network components, as illustrated by the various links connecting AS 195 to other components in cellular core network 130. In one example, AS 195 may comprise all or a portion of a computing device or system, such as computing system 400, and/or processing system 402 as described in connection with FIG. 4 below, and may be configured to perform various operations in connection with localizing user equipment in a mobility network using a time series search, e.g., as described in greater detail below in connection with the example method 300 of FIG. 3.

Figure 4:
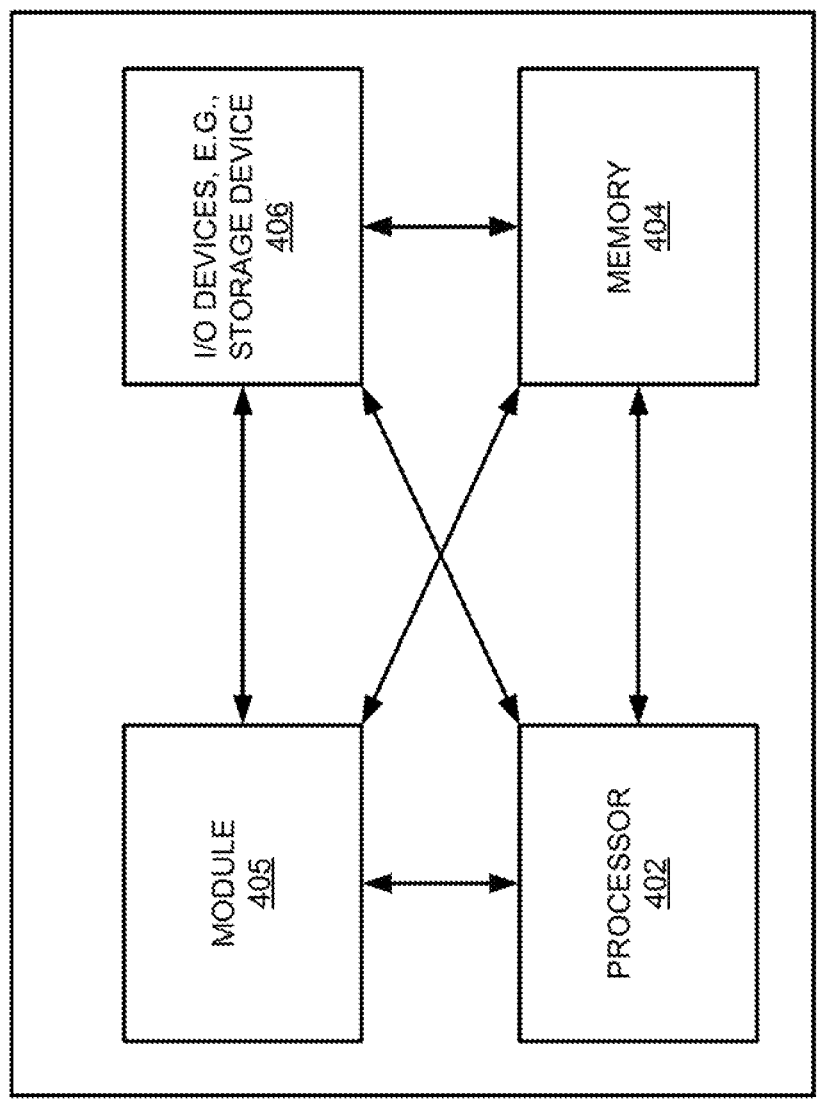
FIG. 4 illustrates an example of a computing device, or computing system, specifically programmed to perform the steps, functions, blocks, and/or operations described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

The foregoing description of the system 100 is provided as an illustrative example only. In other words, the example of system 100 is merely illustrative of one network configuration that is suitable for implementing embodiments of the present disclosure. As such, other logical and/or physical arrangements for the system 100 may be implemented in accordance with the present disclosure. For example, the system 100 may be expanded to include additional networks, such as network operations center (NOC) networks, additional access networks, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For instance, in one example, the cellular core network 130 may further include a Diameter routing agent (DRA) which may be engaged in the proper routing of messages between other elements within cellular core network 130, and with other components of the system 100, such as a call session control function (CSCF) (not shown) in IMS network 150. In another example, the NSSF 136 may be integrated within the AMF 135. In addition, cellular core network 130 may also include additional 5G NG core components, such as: a policy control function (PCF), an authentication server function (AUSF), a network repository function (NRF), and other application functions (AFs). In the above example, the interworking device comprises a dedicated device (e.g., AS 195). However, in another example, the interworking device may comprise another 5G core network (CN) component, such as AMF 135. It should also be noted that in one example, UE 106 may establish and maintain connections to the cellular core network 130 via multiple gNBs. However, for illustrative purposes, the example above is described where UE 106 connects to a single gNB (e.g., cell site 122 or cell site 123, or cell site 122 or cell site 123 in conjunction with baseband processing unit(s) from BBU pool 126). Thus, these and other modifications are all contemplated within the scope of the present disclosure.

Figure 3:
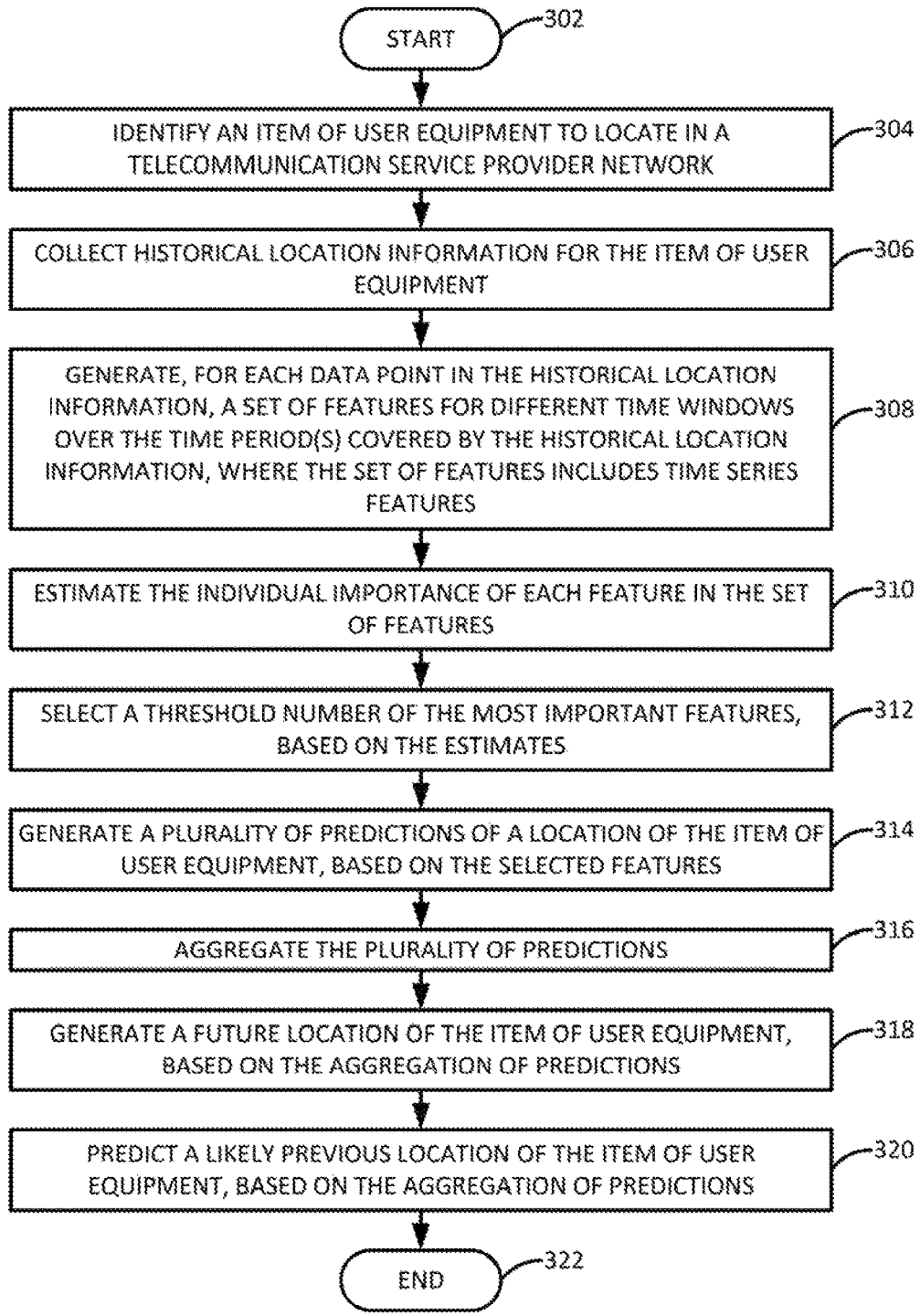
FIG. 3 illustrates a flowchart of an example method for localizing user equipment in a mobility network using a time series search.

FIG. 3 illustrates a flowchart of an example method 300 for localizing user equipment in a mobility network using a time series search, in accordance with the present disclosure. In one example, steps, functions and/or operations of the method 300 may be performed by a device as illustrated in FIG. 1, e.g., AS 195, MME 131, HSS 133, or any one or more components thereof, such as a processing system in a telecommunication service provider network, or collectively via a plurality devices in FIG. 1, such as 195 135 in conjunction with MME 131, NSSF 136, SGW 132, PGW 134, SMF 137, UPF 139, any one or more of cell sites 121-124, and so forth. In one example, the steps, functions, or operations of method 300 may be performed by a computing device or system 400, and/or a processing system 402 as described in connection with FIG. 4 below. For instance, the computing device 400 may represent at least a portion of AS 195, MME 131, and/or HSS 133 in accordance with the present disclosure. For illustrative purposes, the method 300 is described in greater detail below in connection with an example performed by a processing system, such as processing system 402. The method 300 begins in step 302 and proceeds to step 304.

At step 304, the processing system may identify an item of user equipment to locate. The item of user equipment may comprise an endpoint device (e.g., a cellular telephone, a smartphone, a tablet computing device, a laptop computer, a pair of computing glasses, a wireless enabled wristwatch, a wireless transceiver for a fixed wireless broadband (FWB) deployment, or any other cellular-capable mobile telephony and computing device) that is connected to a telecommunication service provider network. For instance, the item of user equipment may comprise an endpoint device that is operated by a wireless service user or subscriber. The item of user equipment may be identified, for example, by IP address, media access control (MAC) address, mobile phone number, mobile identification number (MIN) or mobile subscription identification number (MSIN), or another unique identifier.

At step 306, the processing system may collect historical location information for the item of user equipment. For instance, the processing system may collect historical location information that is associated with a unique identifier belonging to the item of user equipment. In one example, the historical location information may include previous locations of the item of user equipment (i.e., previous relative to a current point in time). In one example, the previous locations may be reported as the coordinates at which the item of user equipment entered and exited a "cell" or coverage area of a cell site in the telecommunication service provider network. The coordinates may be associated with a time stamp indicating a time at which the item of user equipment was present at the coordinates.

Figure 2:
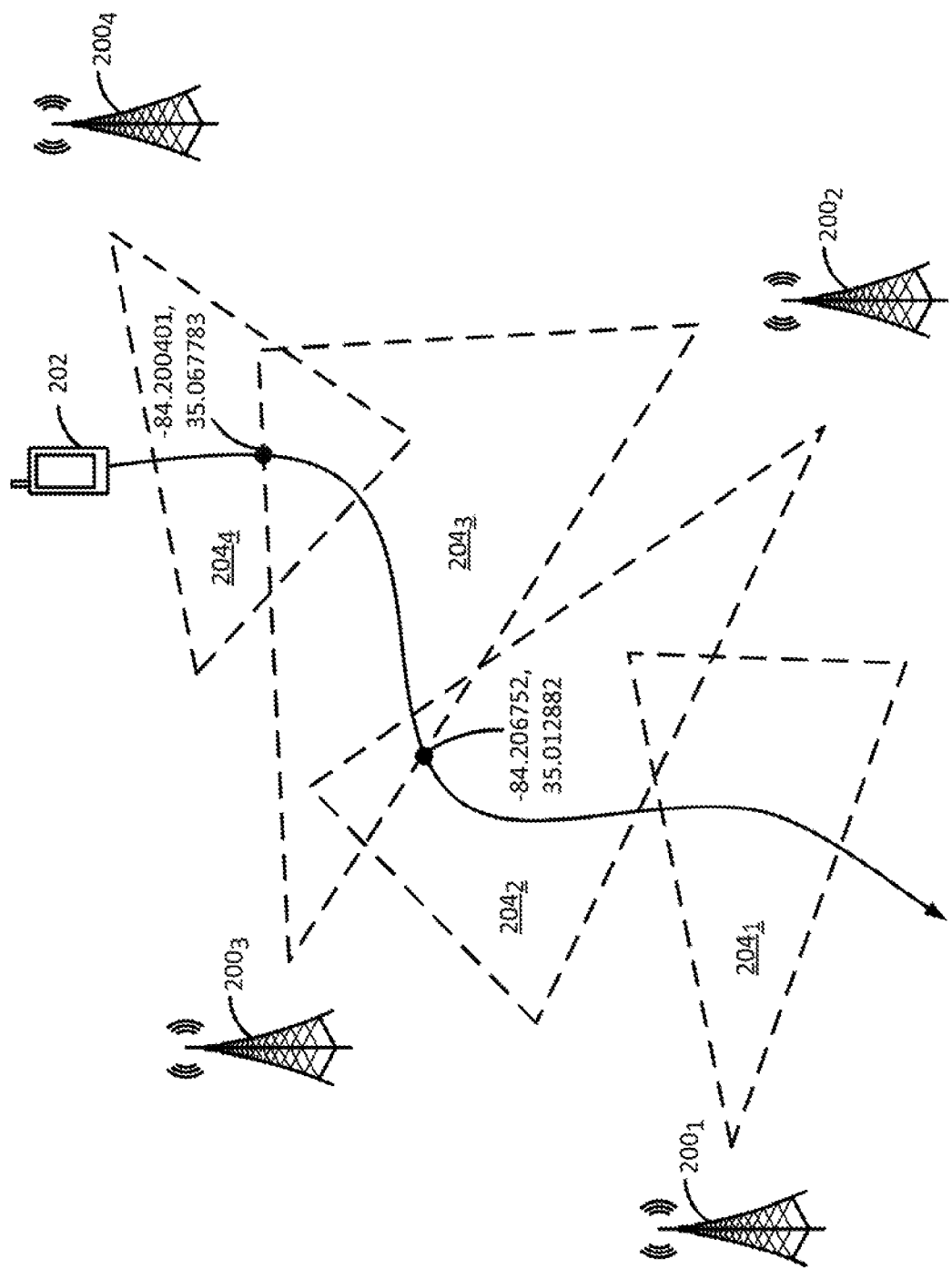
FIG. 2 illustrates a portion of an example telecommunication service provider network.

For instance, FIG. 2 illustrates a portion of an example telecommunication service provider network. The example telecommunication service provider network includes a plurality of cell sites 2001-2004 (hereinafter individually referred to as a "cell site 200" or collectively referred to as "cell sites 200"). The cell sites 200 collectively define a plurality of cells 2041-2044 (hereinafter individually referred to as a "cell 204" or collectively referred to as "cells 204"). In one example, location data for an item of user equipment 202 (e.g., a cellular phone) traveling a route through these cells 204 may comprise pairs of coordinates indicating the locations at which the user equipment 202 entered and exited each of these cells 204. In a further example, the location data may be provided as a plurality of hash values, where each hash value comprises the result of inputting one pair of enter/exit coordinates into a hash function. For instance, if the user equipment entered the cell 2043 at the coordinates −84.200401, 35.067783 and exited the cell 2043 at the coordinates −84.206752, 35.012882, then a hash value produced by inputting the enter/exit coordinates to a hash function might by 000234000037.

Thus, in one example, the historical location information collected in step 306 may comprise a plurality of data points, where each of the data points indicates a location of the item of user equipment in the telecommunication service provider network at a previous point in time. The location may, in one example, be expressed as an enter/exit coordinate pair for a cell of the telecommunication service provider network or as a hash of the enter/exit coordinate pair.

In further examples, the historical location information may also include the usage history of the item of user equipment. The historical location information may be stored in a database that is accessible to the processing system. The historical location information could also be provided to the processing system by the item of user equipment or by other components of the telecommunication service provider network (e.g., an MME, HSS, SGW, or the like).

At step 308, the processing system may generate, for each data point collected in step 306 (e.g., each previous location of the item of user equipment), a set of features for different time windows over the time period(s) covered by the historical location information. In one example, the duration of the time windows is configurable and may be predefined (i.e., prior to the start of the method 300). For instance, a time window may span several minutes, several hours, a full day, several days, and the like.

In one example, the set of features includes time series features and/or prophet features. For instance, the time series features may include one or more of: moving average, lag, exponential moving average, double exponential moving average, weighted moving average, zero lag exponential moving average, rate of change, momentum, relative strength index, and date features. The prophet features may include one or more of prophet additive model features, i.e., features based on a prophet additive model (e.g., SMA moving average envelope, moving average deviation, moving average convergence/divergence) and non-linear trending features (e.g., parabolic fit, cubic fit, spline fit coefficients, Fourier Transform frequency/power).

At step 310, the processing system may estimate the individual importance of each of the features in the set of features generated in step 308. In one example, the importance of a feature refers to the accuracy with which the feature allows for estimation of the location of the item of user equipment. In one example, the individual importance of a feature is estimated by selecting subsets of features from the set of features and performing linear two-dimensional regression on a test sample of data. In a further example, feature importance is estimated based on feature groups that are designed a priori, based on the feature computation methods (as opposed to, e.g., pairwise dependencies between features). These feature groups may comprise, for instance, a simple moving average (SMA) feature group, an adaptive moving average (AMA) feature group, and a rate of change (dV/dt) feature group. In this case, the SMA feature group may include at least moving average, lag, and exponential moving average. The AMA feature group may include at least double exponential moving average, weighted moving average, and zero lag exponential moving average. The dV/dt feature group may include at least rate of change, momentum, and relative strength index. In one example, feature importances may be evaluated continuously.

In step 312, the processing system may select a threshold number of the most important features, based on the estimates generated in step 310. In one example, the threshold number comprises a defined percentage of the top or most important features (e.g., the features that rank in the top ten percent based on estimated importance).

In step 314, the processing system may generate a plurality of predictions of a location of the item of user equipment, based on the features selected in step 312 and on the previous locations of the item of user equipment collected in step 306. In one example, the previous locations and the selected features are provided as inputs to a collection of two-dimensional regression models. In a further example, the collection of two-dimensional regression models includes parametric two-dimensional models (e.g., linear, Gaussian, and polynomial models) as well as non-parametric two-dimensional models (e.g., regression tree and basis function projection models). Each on the two-dimensional regression models may produce as an output a prediction of the current location of the item of user equipment, such that the plurality of predictions is produced. As an example, a multivariate, multiple linear regression model may include explanatory variables that are real-valued (e.g., using values of the feature and location data), and the dependent variable of the model (e.g., the prediction of the current location) may be two-dimensional.

In step 316, the processing system may aggregate the plurality of predictions. In one example, aggregation of the plurality of predictions involves generating a vector average of the plurality of predictions. As an example, stacking is one ensemble method that can be used to derive a single prediction (e.g., the vector average) from the plurality of predictions.

In optional step 318 (illustrated in phantom), the processing system may predict a next or future location of the item of user equipment, based the aggregation of the plurality of predictions and on at least a subset of the previous locations (e.g., the x most recent locations). In one example, each multivariate regression method uses a selection of features generated by the method 200 and derived from the location and customer data. For instance, ten sample moving average location data points may be derived from raw location data, and these two time series may be input to one multivariate multiple linear regression model. Once the multivariate multiple linear regression model has been generated, the model can produce a predicted next location. In further examples, given a collection of multivariate regression methods, a stacking ensemble method (e.g., in accordance with step 316) can produce a single prediction from the collection of trained models.

In optional step 320 (illustrated in phantom), the processing system may predict a likely previous location of the item of user equipment (i.e., a location that was not seen in the previous locations collected in step 306), based on the aggregation of the plurality of predictions and on at least a subset of the previous locations (e.g., at least two consecutive previous locations). In one example, the processing system may predict the likely previous location by interpolating between two of the previous locations that are shown in the data collected in step 306. The likely previous location may be predicted in a manner similar to the predicted next location, described above.

The method may end in step 322. However, the method 300 may be repeated for the item of user equipment any number of times. Moreover, the method of 300 may be repeated for other items of user equipment in the telecommunication service provider network. For instance, the method 300 could be used to simultaneously estimate the locations of a plurality of items of user equipment in the telecommunication service provider network.

It should be noted that the method 300 may be expanded to include additional steps or may be modified to include additional operations with respect to the steps outlined above. In addition, although not specifically specified, one or more steps, functions, or operations of the method 300 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 3 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

FIG. 4 depicts a high-level block diagram of a computing device or processing system specifically programmed to perform the functions described herein. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for localizing user equipment in a mobility network using a time series search, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 406 may also include antenna elements, antenna arrays, remote radio heads (RRHs), baseband units (BBUs), transceivers, power units, and so forth. Although only one processor element is shown, it should be noted that the computing device may employ a plurality of processor elements. Furthermore, although only one computing device is shown in the figure, if the method 300 as discussed above is implemented in a distributed or parallel manner for a particular illustrative example, i.e., the steps of the above method 300, or the entire method 300 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 300. In one example, instructions and data for the present module or process 405 for localizing user equipment in a mobility network using a time series search (e.g., a software program comprising computer-executable instructions) can be loaded into memory 404 and executed by hardware processor element 402 to implement the steps, functions, or operations as discussed above in connection with the illustrative method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for localizing user equipment in a mobility network using a time series search (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
   collecting, by a processing system of a telecommunication service provider network, a plurality of data points, wherein each data point of the plurality of data points indicates a location of an item of user equipment in the telecommunication service provider network at a point in time previous a current time;
   generating, by the processing system, for each data point of the plurality of data points, a plurality of features over a plurality of time windows within a time period covered by the plurality of data points, wherein the plurality of features includes time series features;
   estimating, by the processing system, an importance of each feature in the plurality of features, wherein the importance indicates an expected degree of accuracy of an estimation of an unseen location of the item of user equipment, wherein the estimation is based on the each feature, and wherein the unseen location is a location that is not identified in the plurality of data points;
   selecting, by the processing system, at least one feature from the plurality of features, wherein the at least one feature has a greatest importance relative to all features in the plurality of features;
   generating, by the processing system, a plurality of predictions of the unseen location, based on the at least one feature and on locations of the item of user equipment at previous points in time as indicated by the plurality of data points;
   aggregating, by the processing system, the plurality of predictions; and
   estimating, by the processing system, the unseen location based on the aggregating.

2. The method of claim 1, wherein each data point of the plurality of data points comprises a first set of coordinates and a second set of coordinates, the first set of coordinates indicates a location at which the item of user equipment entered a cell of the telecommunication service provider network, and the second set of coordinates indicates a location at which the item of user equipment exited the cell of the telecommunication service provider network.

3. The method of claim 1, wherein each data point of the plurality of data points comprises a hash value, the hash value comprises a hash of a first set of coordinates and a second set of coordinates, the first set of coordinates indicates a location at which the item of user equipment entered a cell of the telecommunication service provider network, and the second set of coordinates indicates a location at which the item of user equipment exited the cell of the telecommunication service provider network.

4. The method of claim 1, wherein the plurality of features further comprises prophet features.

5. The method of claim 4, wherein the prophet features comprise prophet additive model features and non-linear trending features.

6. The method of claim 5, wherein the prophet additive model features comprise simple moving average moving average envelope, moving average deviation, and moving average convergence/divergence.

7. The method of claim 5, wherein the non-linear trending features comprise parabolic fit, cubic fit, spline fit coefficients, and Fourier Transform frequency/power.

8. The method of claim 1, wherein the estimating the importance comprises:
   selecting, by the processing system, a group of features from the plurality of features, wherein the group includes the each feature; and
   performing, by the processing system, linear two-dimensional regression on a selected data point of the plurality of data points, based on features in the group of features.

9. The method of claim 8, wherein the group of features is determined a priori.

10. The method of claim 9, wherein the group of features comprises moving average, lag, and exponential moving average.

11. The method of claim 9, wherein the group of features comprises double exponential moving average, weighted moving average, and zero lag exponential moving average.

12. The method of claim 9, wherein the group of features comprises rate of change, momentum, and relative strength.

13. The method of claim 1, wherein the generating the plurality of predictions comprises:
   providing, by the processing system, the plurality of data points and the at least one feature for the each data point to a plurality of two-dimensional regression models, wherein outputs of the plurality of two-dimensional regression models comprise the plurality of predictions.

14. The method of claim 1, wherein the aggregating comprises:
   generating, by the processing system, a vector average of the plurality of predictions.

15. The method of claim 1, wherein the unseen location is a future location of the item of user equipment.

16. The method of claim 1, wherein the unseen location is a location at which the item of user equipment was present at a point in time between a first point in time and a second point in time for which data points of the plurality of data points are available.

17. A non-transitory computer-readable medium storing instructions which, when executed by a processing system of a telecommunication service provider network, cause the processing system to perform operations, the operations comprising:
   collecting a plurality of data points, wherein each data point of the plurality of data points indicates a location of an item of user equipment in the telecommunication service provider network at a point in time previous to a current time;
   generating for a first data point of the plurality of data points, a plurality of features over a plurality of time windows within a time period covered by the plurality of data points, wherein the plurality of features includes time series features;
   estimating an importance of each feature in the plurality of features, wherein the importance indicates an expected degree of accuracy of an estimation of an unseen location of the item of user equipment, wherein the estimation is based on the each feature, and wherein the unseen location is a location that is not identified in the plurality of data points;
   selecting at least one feature from the plurality of features, wherein the at least one feature has a greatest importance relative to all features in the plurality of features;
   generating a plurality of predictions of the unseen location, based on the at least one feature and on locations of the item of user equipment at previous points in time as indicated by the plurality of data points;
   aggregating the plurality of predictions; and
   estimating the unseen location based on the aggregating.

18. The non-transitory computer-readable medium of claim 17, wherein each data point of the plurality of data points comprises a first set of coordinates and a second set of coordinates, the first set of coordinates indicates a location at which the item of user equipment entered a cell of the telecommunication service provider network, and the second set of coordinates indicates a location at which the item of user equipment exited the cell of the telecommunication service provider network.

19. The non-transitory computer-readable medium of claim 17, wherein each data point of the plurality of data points comprises a hash value, the hash value comprises a hash of a first set of coordinates and a second set of coordinates, the first set of coordinates indicates a location at which the item of user equipment entered a cell of the telecommunication service provider network, and the second set of coordinates indicates a location at which the item of user equipment exited the cell of the telecommunication service provider network.

20. A device comprising:
   a processing system including at least one processor; and
   a non-transitory computer-readable medium storing instructions which, when executed by the processing system when deployed in a telecommunication service provider network, cause the processing system to perform operations, the operations comprising:
   collecting a plurality of data points, wherein each data point of the plurality of data points indicates a location of an item of user equipment in the telecommunication service provider network at a point in time previous to a current time;
   generating for a first data point of the plurality of data points, a plurality of features over a plurality of time windows within a time period covered by the plurality of data points, wherein the plurality of features includes time series features;
   estimating an importance of each feature in the plurality of features, wherein the importance indicates an expected degree of accuracy of an estimation of an unseen location of the item of user equipment, wherein the estimation is based on the each feature, and wherein the unseen location is a location that is not identified in the plurality of data points;
   selecting at least one feature from the plurality of features, wherein the at least one feature has a greatest importance relative to all features in the plurality of features;
   generating a plurality of predictions of the unseen location, based on the at least one feature and on locations of the item of user equipment at previous points in time as indicated by the plurality of data points;
   aggregating the plurality of predictions; and estimating the unseen location based on the aggregating.

\* \* \* \* \*